United States Patent
Sumner et al.

(10) Patent No.: US 8,184,547 B2
(45) Date of Patent: May 22, 2012

(54) DISCRETE CHOICE METHOD OF REPORTING AND PREDICTING MULTIPLE TRANSACTION TYPES

(75) Inventors: Roger Sumner, Batavia, IL (US); Anthony Dezonno, Bloomingdale, IL (US)

(73) Assignee: Aspect Software, Inc., Lombard, IL (US)

(*) Notice: Subject to any disclaimer, the term of this patent is extended or adjusted under 35 U.S.C. 154(b) by 991 days.

(21) Appl. No.: 10/991,757

(22) Filed: Nov. 18, 2004

(65) Prior Publication Data

US 2006/0104213 A1   May 18, 2006

(51) Int. Cl.
*G01R 31/08* (2006.01)

(52) U.S. Cl. ........ 370/252; 370/264; 370/265; 370/341; 370/433; 370/480; 379/112.01

(58) Field of Classification Search .......... 370/241–253, 370/485, 335, 352, 264, 265, 341, 433, 480; 707/3; 709/223; 705/8, 10, 7

See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,373,836 B1 | 4/2002 | Deryugin et al. | |
| 6,389,007 B1 | 5/2002 | Shenkman et al. | |

(Continued)

OTHER PUBLICATIONS

"Applied Categorical & Nonnormal Data Analysis, Multinomial Logistic Regression Models;" http://www.gseis.ucla.edu/courses/ed231c/notes3/mlogit1.html; Mar. 6, 2001.*

(Continued)

*Primary Examiner* — Kibrom T Hailu
(74) *Attorney, Agent, or Firm* — Husch Blackwell LLP

(57) ABSTRACT

The method for and system or apparatus for forecasting future communication transaction traffic from a customer include the steps of or structure for: collecting communication channel data on at least first and second communication channels; performing a numeric transformation to the data; calculating a discrete choice probability for each communication channel; and forecasting future period usage values for a user on a communication channel.

36 Claims, 7 Drawing Sheets

U.S. PATENT DOCUMENTS

| | | | | |
|---|---|---|---|---|
| 6,393,015 | B1 | 5/2002 | Shtivelman | |
| 6,732,156 | B2 | 5/2004 | Miloslavsky | |
| 6,934,748 | B1* | 8/2005 | Louviere et al. | 709/224 |
| 7,301,903 | B2* | 11/2007 | Brady | 370/230 |
| 7,369,490 | B2* | 5/2008 | Zahir Azami et al. | 370/230 |
| 2003/0156603 | A1* | 8/2003 | Rakib et al. | 370/485 |
| 2004/0088392 | A1* | 5/2004 | Barrett et al. | 709/223 |
| 2004/0179496 | A1* | 9/2004 | Abrishamkar et al. | 370/335 |
| 2005/0084082 | A1* | 4/2005 | Horvitz et al. | 379/114.06 |
| 2005/0120009 | A1* | 6/2005 | Aker | 707/3 |
| 2005/0163103 | A1* | 7/2005 | Malomsoky et al. | 370/352 |
| 2006/0182034 | A1* | 8/2006 | Klinker et al. | 370/238 |

OTHER PUBLICATIONS

Hayes, John P; "A Graph Model for Fault-Tolerant Computing Systems;" IEEE Transactions on Computers, vol. C-25, No. 9, pp. 875-884, Sep. 1976.*

Tiwari et al; "Containerized Cargo Shipper's Behavior in China: A Discrete Choice Analysys;" http://www.bts.gov/cgi-bin/breadcrumbs/PrintVersion.cgi?date=17105237; Aug. 23, 2004.*

Tiwari et al (Containerized Cargo Shipper's Behavior in China: A Discrete Choice Analysis, Aug. 23, 2004).*

John P. Hayes (A Graph Model for Fault-Tolerant Computing Systems; 1976).*

* cited by examiner

DISCRETE CHOICE METHOD OF REPORTING AND PREDICTING MULTIPLE TRANSACTION TYPES

BACKGROUND

1. Field of the Invention

The present invention relates to a method and system for collecting, forecasting and displaying transaction traffic from a variety of communication inquiry types. More specifically the invention relates to a real-time sub-system of trace information that tracks the type of voice and data applications used by a customer while processing their inquiries for the purposes of enhancing or predicting future technology behavior patterns of the customer

2. Description of the Related Art

Prior solutions for collecting, forecasting and displaying transaction traffic lack the ability to coordinate or forecast information from a variety of communication mechanisms. These systems typically collect information on a single type of communication method, such as voice, SIP (Session Initiated Protocol), VoIP (Voice over Internet Protocol), e-mail, or instant messaging, and do not integrate this information into an overall assessment of the relationship between communications occurring through a variety of communications types. Work Force Management (WFM) systems today, for instance, perform predictions on a singular communication type, like a voice call, and do not incorporate mechanisms for calculating communication traffic in various formats. Since an individual may choose to communicate over multiple communication methods such as voice and e-mail, a singular communication system may not be able to handle multiple communication mechanisms. A user may normally prefer voice calls, but may over time switch their choice to e-mail calls based on a value (utility) that they may assign to communicating with the call center with a particular communication method.

BRIEF SUMMARY OF THE INVENTION

According to one possible embodiment of the invention, there is provided a method for forecasting future communication transaction traffic from a customer comprising the steps of:
  collecting communication channel data on at least first and second communication channels;
  performing a numeric transformation to the data;
  calculating a discrete choice probability for each communication channel; and
  forecasting future period usage values for a user on a communication channel.

BRIEF DESCRIPTION OF THE SEVERAL VIEWS OF THE DRAWINGS

One possible embodiment of the invention, together with the advantages thereof, may be understood by reference to the following description in conjunction with the accompanying figures, which illustrate one embodiment of the invention

DETAILED DESCRIPTION

Figure 1:
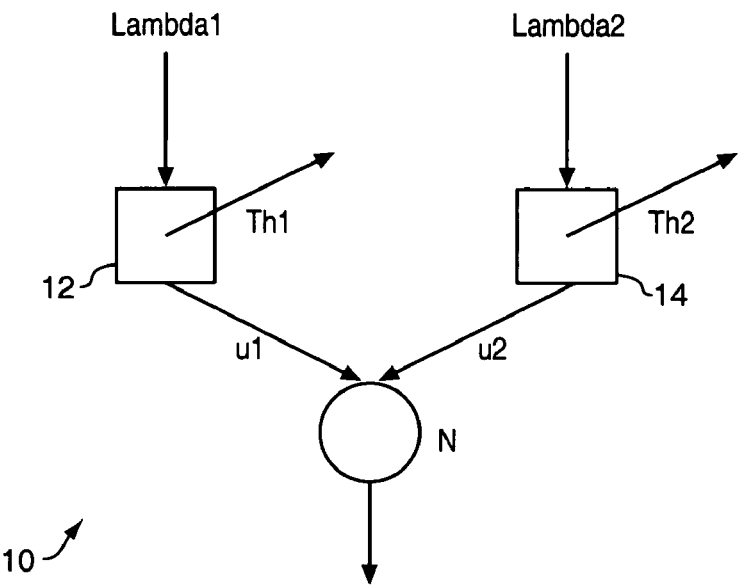
FIG. 1 is a diagram of a traditional representation of a system with multiple transactions at given rates.

While one possible embodiment of the invention described herein is susceptible of embodiments in various forms, there is shown in the drawings and will hereinafter be described some exemplary and non-limiting embodiments, with the understanding that the present disclosure is to be considered an exemplification of one possible embodiment of the invention and is not intended to limit the possible embodiments of the invention to the specific embodiments illustrated. In this disclosure, the use of the disjunctive is intended to include the conjunctive. The use of the definite article or indefinite article is not intended to indicate cardinality. In particular, a reference to "the" object or "a" object is intended to denote also one of a possible plurality of such objects.

The diagram shown in FIG. 1 is a traditional PRIOR ART representation of a system 10 with multiple transactions at given arrival rates lambda entering queues 12 and 14 shown with square boxes 12 and 14. Abandon rates are shown as the variable theta (TH) leaving a summed total number of transactions to be processed illustrated as a circle N and representing the variable N. The problem with this approach, though, is that it assumes that the rates of the transaction types are statistically independent of each other.

In this approach, the number of transaction by type by an individual or group are not independent as it is a choice of which communications method to employ for a transaction and not they are not independent of each other. Additionally, this is not a conditional probability problem as use of one type of communication, does not imply or cause the use of another type of communication. As such, current methods of forecasting and estimation are ineffective in predicting application utilization.

According to one possible embodiment of the invention, a different approach, named Discrete Choice Modeling (DCM), is employed to predict communication application usage. Discrete choice modeling is a relatively new technique that describes the problems where a single choice is made among a group of choices (like product features or functionality—Coke or Pepsi, Honda vs. Ford) rather than requiring that independent probability models be used. DCM is being developed in the area of marketing research to determine success possibilities of consumer products.

The technique deployed in this solution is Multinomial Logit Estimation. Logit is a comprehensive package for logistic regression analysis, providing tools for model building, model evaluation, prediction, simulation, hypothesis testing and regression diagnostics. A fast, full featured software package, Logit is capable of handling an unlimited number of cases and includes special tools for discrete choice models.

Alternately, other transformational solution techniques such as Hayes or exponential formulas may be considered useful in the solution. Assume a simple example with two alternative communication methods A and B. It should be appreciated that a multiplicity of communication methods may be used in the modeling, including but not limited to, voice and data applications. Possible applications include, telephone, e-mail, chat, SIP, VoIP, text messaging, instant messaging, and others. Also, it is possible for the multiplicity of methods to also include multiple identification mechanisms for a single communication method; for example, 2 e-mail addresses that are possible to use to communicate to a company. Further, it is possible to incorporate all possible combinations of the above to the system so that predictions and reporting can be done against the different communications. A vector X of N predictor variables that could include dummy variables representing brands, continuous or discrete price variables, or other nominal or continuous attributes describes each alternative. Multinomial logit solves for a vector $\beta$ of N parameters of the same rank as X according to the method of maximum likelihood. For any alternative within any set:

$$V = \sum_{i=1}^{N} \beta_i X_i$$

V can be interpreted as the utility of the alternative, and is, as seen, the outcome of a linear equation. However, it has no particular meaning until subjected an to exponential transformation:

$$U = \exp(V)$$

This is the natural antilog and always produces a positive number. As we have two alternatives, $$U_A = \exp(V_A)$$

$$U_B = \exp(V_B)$$

The probability that alternative A will be chosen given its attributes and those of the other alternatives is:

$$pA|[A,B] = U_A/(U_A + U_B)$$

Likewise:

$$pB|[A,B] = U_B/(U_A + U_B)$$

And since the user must choose a communication method A or B $$pA + pB = 1.00$$

Program output typically consists of the coefficients and other estimation statistics. However, the vector of coefficients ($\beta$) enables us to make the best possible predictions of choice probabilities according to these equations.

Figure 2:
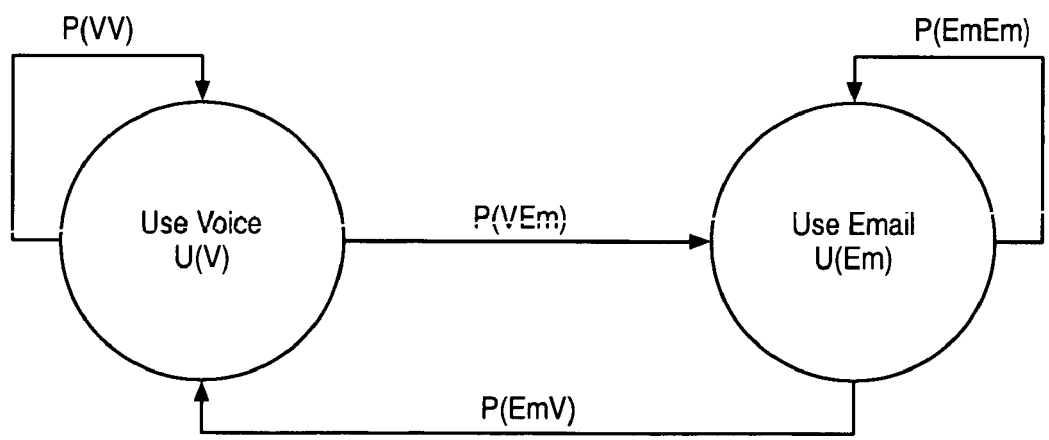
FIG. 2 is a Markov representation of a model of discrete choice modeling for predicting communication application usage.

A Markov representation of the model is shown in FIG. 2 and represents how a user may select to use Voice or E-mail to communicate with a contact center:

In this example, a voice call may be considered a communications type A communication and an E-mail message may be considered a communications type B communication. Each of these utilities and probabilities of the communication types may be time variant. For this example, initially it is assumed that the user has no preference on which communications method they employ, or that each is treated as having equal benefit/utility to the User.

U(V)—Utility (benefit) of using a voice communications assume to be 1.

P(VV)—Probability of using Voice to communicate if they normally use voice communication methods.

P(VEm)—Probability of going to use E-mail if they normally use voice.

P(EmV)—Probability of switch to voice communication if they are using E-mail communications U(Em)—Utility (benefit) of using an e-mail communications assume to be 1.

P(EmEm)—Probability of using e-mail to communicate if they normally use e-mail communication methods.

This system can be described with $$P(V) = P(VV) + P(EmV) - P(VEm)$$

$$P(Em) = P(EmEm) + P(VEm) - P(EmV)$$

And with $$P(V) + P(Em) = 1$$

we also get:

$1 = P(VV) + P(EmEm)$ from adding the above equations together.

A possible customer profile of usage is shown in Table 1, below. Note that this may not only be the type of technology being employed in the transaction, but may also be the choice of a particular voice or data application by a customer.

A numerical example is present to further illustrate the technique. The number of communications of Type A and Type B over given time periods are tabulated and collected as sum representations of an individual user. In the following table are set forth possible numbers of communications of each type for the purposes of illustrating the DCM.

TABLE 1

| TIME | TYPE A | TYPE B | Total | TOTAL A | TOTAL B | SUM TOTAL |
| --- | --- | --- | --- | --- | --- | --- |
| 1 | 1 | 0 | 1 | 1 | 0 | 1 |
| 2 | 3 | 0 | 3 | 4 | 0 | 4 |
| 3 | 4 | 0 | 4 | 8 | 0 | 8 |
| 4 | 5 | 2 | 7 | 13 | 2 | 15 |
| 5 | 7 | 3 | 10 | 20 | 5 | 25 |
| 6 | 4 | 5 | 9 | 24 | 10 | 34 |
| 7 | 3 | 8 | 11 | 27 | 18 | 45 |
| 8 | 2 | 7 | 9 | 29 | 25 | 54 |
| 9 | 0 | 8 | 8 | 29 | 33 | 62 |
| 10 | 0 | 8 | 8 | 29 | 41 | 70 |

Figure 3:
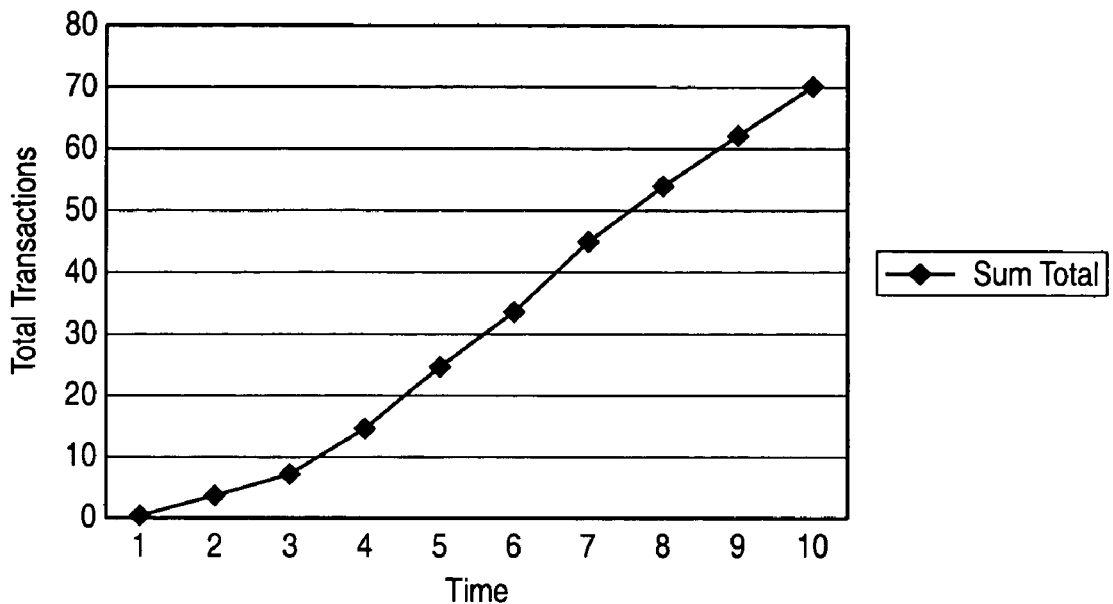
FIG. 3 is a graph of the total transactions from the user over a time period history used in communication of type A and in communication of type B.
Figure 4:
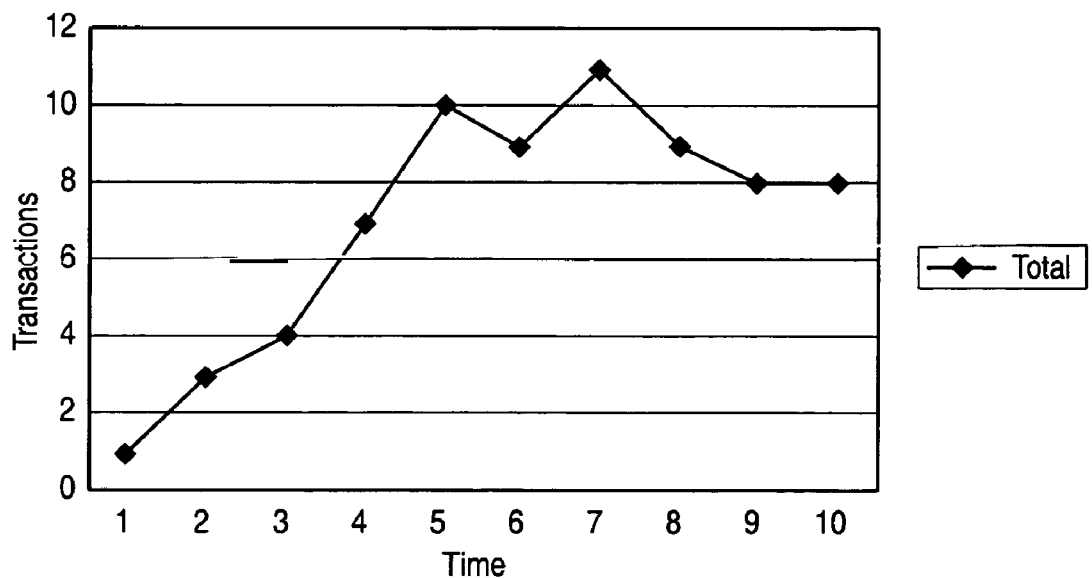
FIG. 4 is a graph of a summary of the total communications of all types by a user during time period intervals to show a level of activity.

So the total transactions from the user are 70 for both communication types at the $10^{th}$ time period. Values at different points triggered by events, time, or periods of time may be collected from multiple transaction systems to correlate the information. The time periods may be over intervals or at various instances of time or at any useful point of collection whether it time based or event based, as another possible embodiment. For example, the occurrence of an event may trigger the collection of the number of transactions being processed by the various communication systems. A graph of the total number of transactions used in communication of type A and in communication of type B over a time period history is shown in FIG. 3. And summing the total of communications of all types during time period intervals shows a level of activity of a communication type, which is illustrated in FIG. 4.

Figure 5:
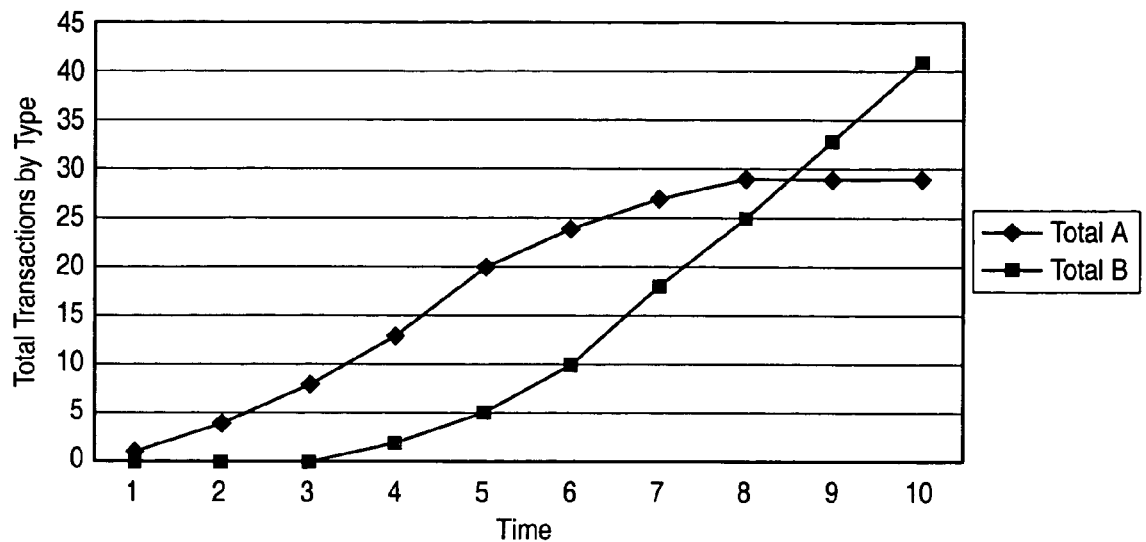
FIG. 5 is a graph of total transactions in a time period history to show a change in selection of a communication type.

When we look at the data by type during the periods, usage trends appear. In this case, it is assumed to be a discrete choice as to whether Type A or Type B methods are employed. The decline in the rate of increase of the total number of transactions of methods employed shows a change in the type of communication from total Type A to total Type B as shown in FIG. 5.

Figure 6:
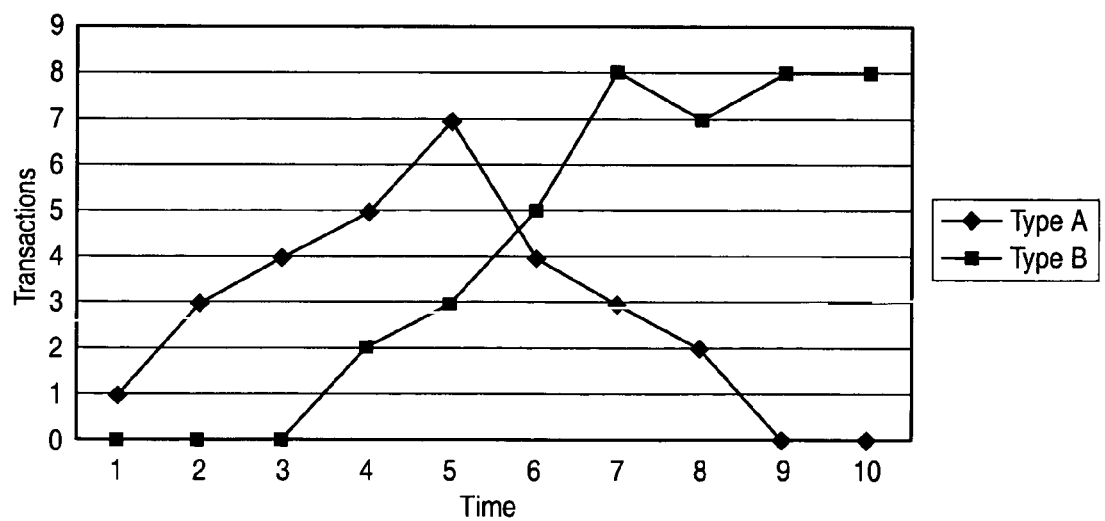
FIG. 6 is a graph of the number of transactions of communication type A and communication type B types by a user during a specific interval of time period showing a switching from a dominant type A communication preference to a dominant type B communication preference.

This particular user is switching from a dominant Type A communication method or preference to a dominant Type B communication method or preference when looking at this from the number of transaction types per period as shown in FIG. 6. A numerical probability for each communication type during a given time period may be simply found by dividing the number of type transactions over the sum total of the transactions.

Figure 7:
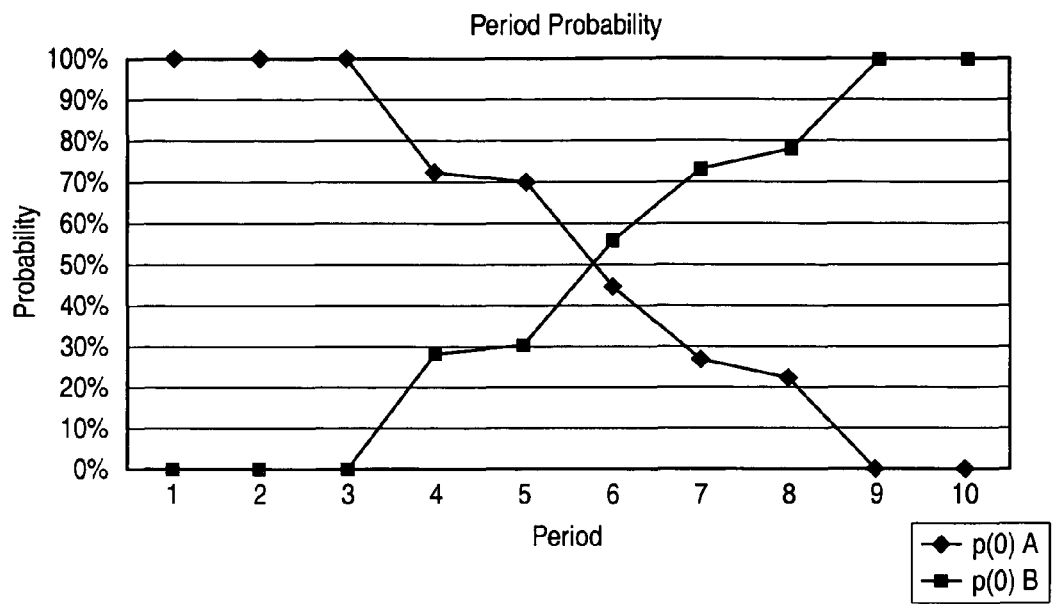
FIG. 7 is a graph of numeric probability for a given time period over a time period history for usage of communication of type A or communication of type B as a choice of communication type.
Figure 8:
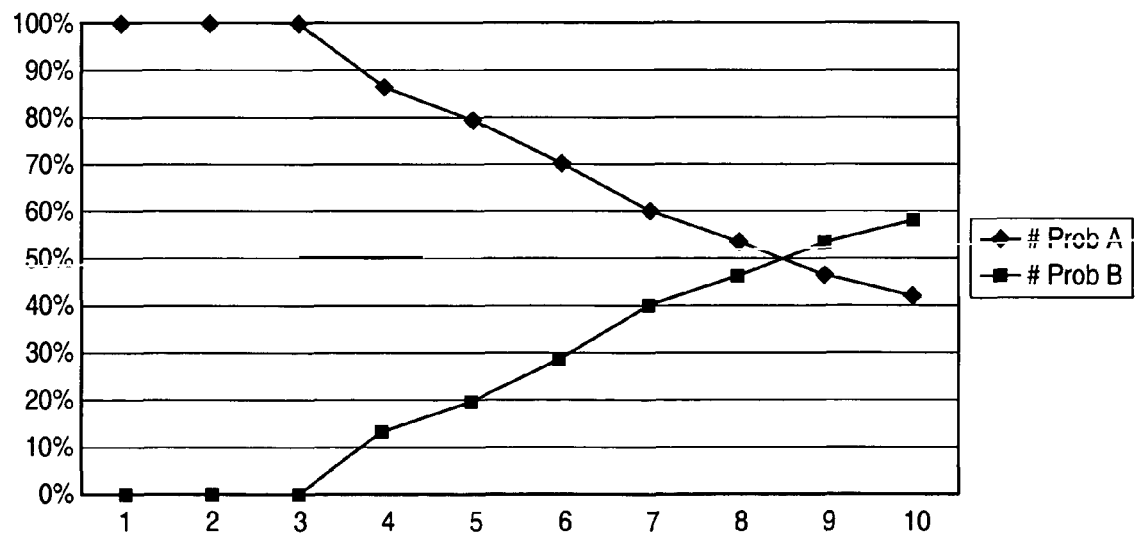
FIG. 8 is a graph of a total numerical probability over several time periods using the quantity of transactions.

However, this approach uses the actual counts and does not allow for a prediction since it is after the period has completed and does not allow for planning of resources for handling the transaction. Also, it may be erratic data open to wild fluctuations depending on the number of transactions generated with the user for a time period or at an event trigger. See the graph in FIG. 7 and the graph in FIG. 8.

The total numerical probability for an illustrated example over the periods is shown in Table 2, below. However, different time periods allow this to change given that a user has a choice of communication methods. In the case above, for the first 3 periods, only the type A communication method was used even though type B was also available. From the actual numbers, this shows a 100% probability of using Type A, although this clearly can not be the case given that type B is also available and resources must be allocated and set aside to handle Type B communications if they were to occur. For planning purposes, allowing a user 2 methods of communicating with a contact center implies there is at least some likelihood that a second method may be chosen by a user and a suitable level of resources should be allocated for handling the transaction, such as the number of call center representatives, the training of call center representatives, the scheduling of call center representatives, e-mail accounts, or e-mail storage space. As the number of transactions increases a more accurate estimate is possible for the type of transaction that the user may employee.

Applying a DCM method to the data from the various transaction sources allows for a prediction of the cases. The following Table 2 is generated from the data

TABLE 2

| exp U(A) | exp U(B) | Ua | Ub | DCM P(A) | DCM P(B) | Err A | Err B |
|---|---|---|---|---|---|---|---|
| 271.83% | 100.00% | 73% | 27% | 73% | 27% | −27% | 27% |
| 271.83% | 100.00% | 73% | 27% | 73% | 27% | −27% | 27% |
| 271.83% | 100.00% | 73% | 27% | 73% | 27% | −27% | 27% |
| 237.90% | 114.26% | 68% | 32% | 68% | 32% | −19% | 19% |
| 222.55% | 122.14% | 65% | 35% | 65% | 35% | −15% | 15% |
| 202.56% | 134.19% | 60% | 40% | 60% | 40% | −10% | 10% |
| 182.21% | 149.18% | 55% | 45% | 55% | 45% | −5% | 5% |

TABLE 2-continued

| exp U(A) | exp U(B) | Ua | Ub | DCM P(A) | DCM P(B) | Err A | Err B |
|---|---|---|---|---|---|---|---|
| 171.09% | 158.88% | 52% | 48% | 52% | 48% | −2% | 2% |
| 159.64% | 170.28% | 48% | 52% | 48% | 52% | 2% | −2% |
| 151.33% | 179.63% | 46% | 54% | 46% | 54% | 4% | −4% |

Figure 9:
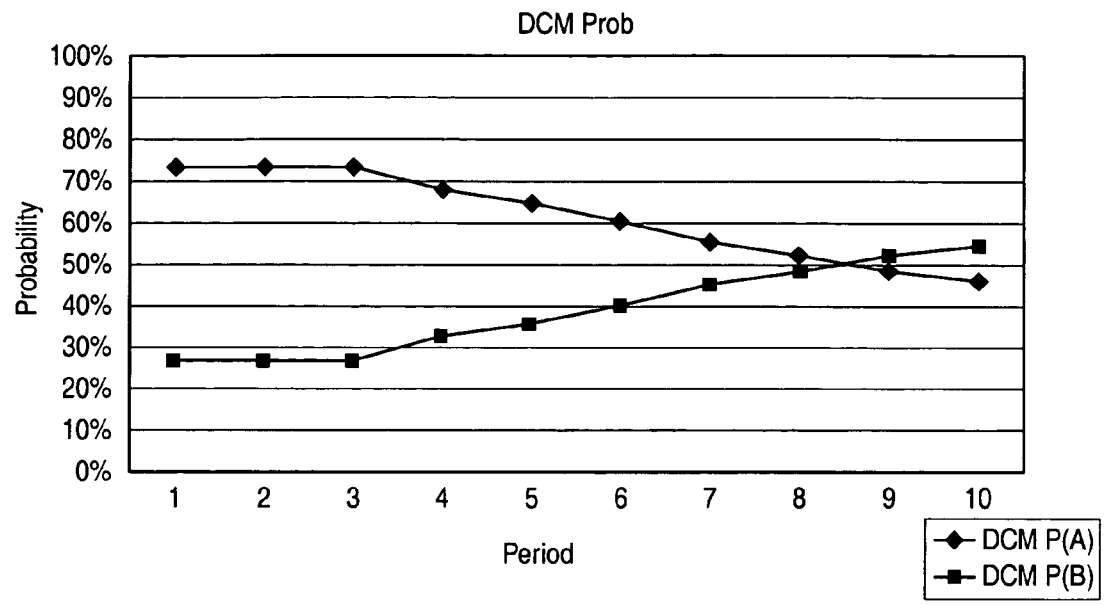
FIG. 9 is a graph of probability versus a time period with a discrete choice modeling probability.
Figure 10:
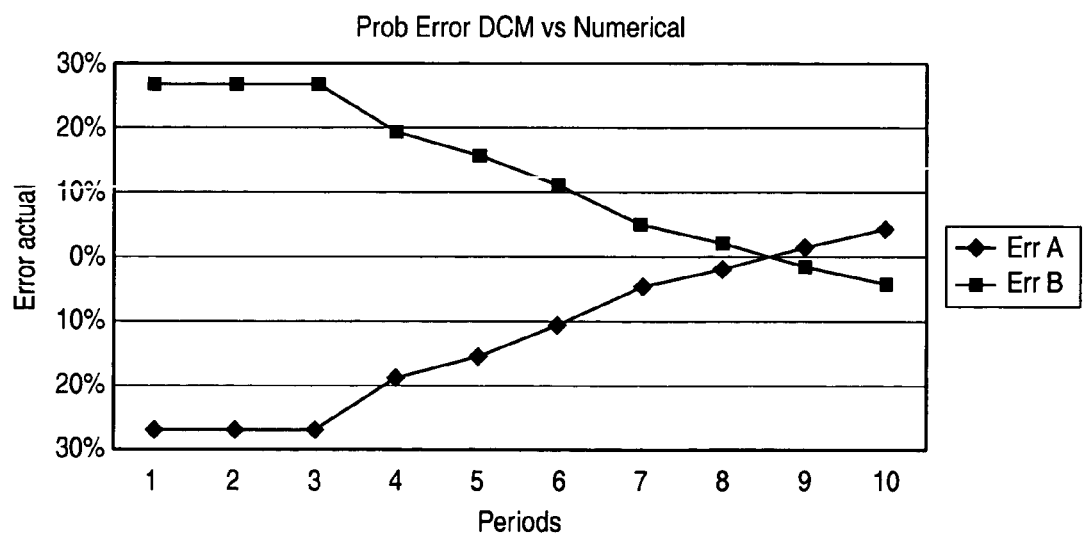
FIG. 10 is a graph of the amount of error difference between a discrete choice modeling probability and an actual numerical probability for communications type A and communications type B.

The transaction probability of various types can then be shown in DCM P(A) and DCM P(B) for calculation and planning purposes as shown in FIG. 9. The error of the DCM solution when compared to the actual numerical probability quickly approaches acceptable levels as the number of transactions increases over time periods as shown in FIG. 10.

A discrete math Logit conversion may be used in place of an exponential transform to decrease the amount of error level in the calculated value. Alternate numerical solutions using Hierarchical Bayesian or other exponential procedures can be used for predicting the choice probability for each type of transaction. Utility and benefit values, alternately, may be loadable from the communication system, or derived from equations predicating these values, rather than being a fixed constant value. It is desirable that the actual preference for one method over another be calculated based upon the number of transactions collected in each communication type system as the measure of the usage of the communication method. With this DCM data, a least squared method may be deployed for forecasting future trends of each of the transaction types from the results of the calculations.

Figure 11:
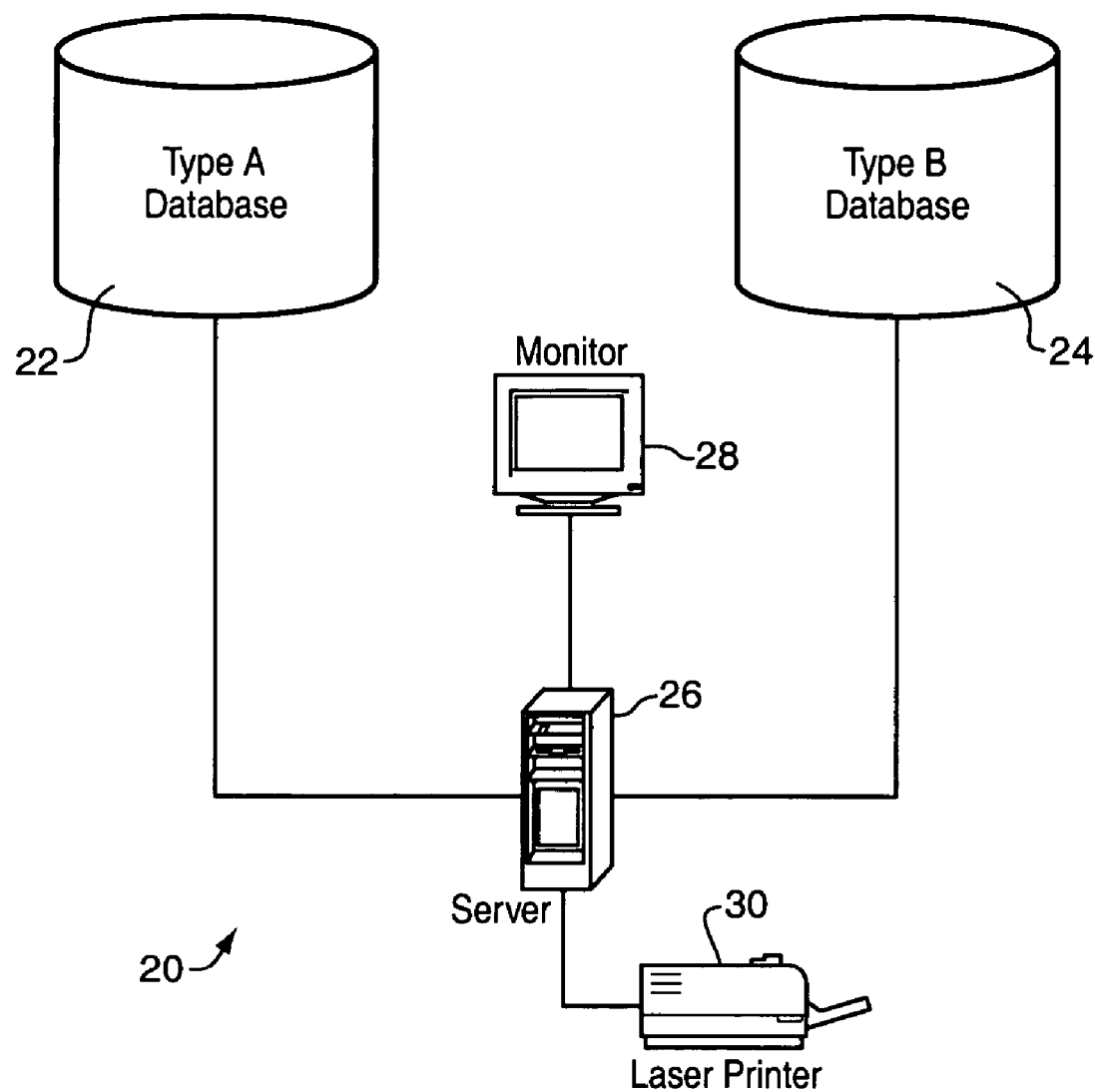
FIG. 11 is a block diagram of a system of one possible embodiment of the invention for carrying out the method and for displaying the results on either a monitor or as a print-out from a printer.

FIG. 11 illustrates a possible embodiment of a software application with access into a communication method system containing transaction information (Databases, files, configuration, reporting system, realtime information interfaces or others) of multiple type systems that can be displayed to a user either on a print out or on a monitor. A system 20 is shown in FIG. 11 and the Type A transactions are stored in a database 22 and the Type B transactions are stored in a database 24. Both databases are coupled to a server 26 which can output performance and prediction information to a monitor 28 or to a printer 30 for providing a display or printout of the probability of the next type of transaction by the user or by a group of users.

Figure 12:
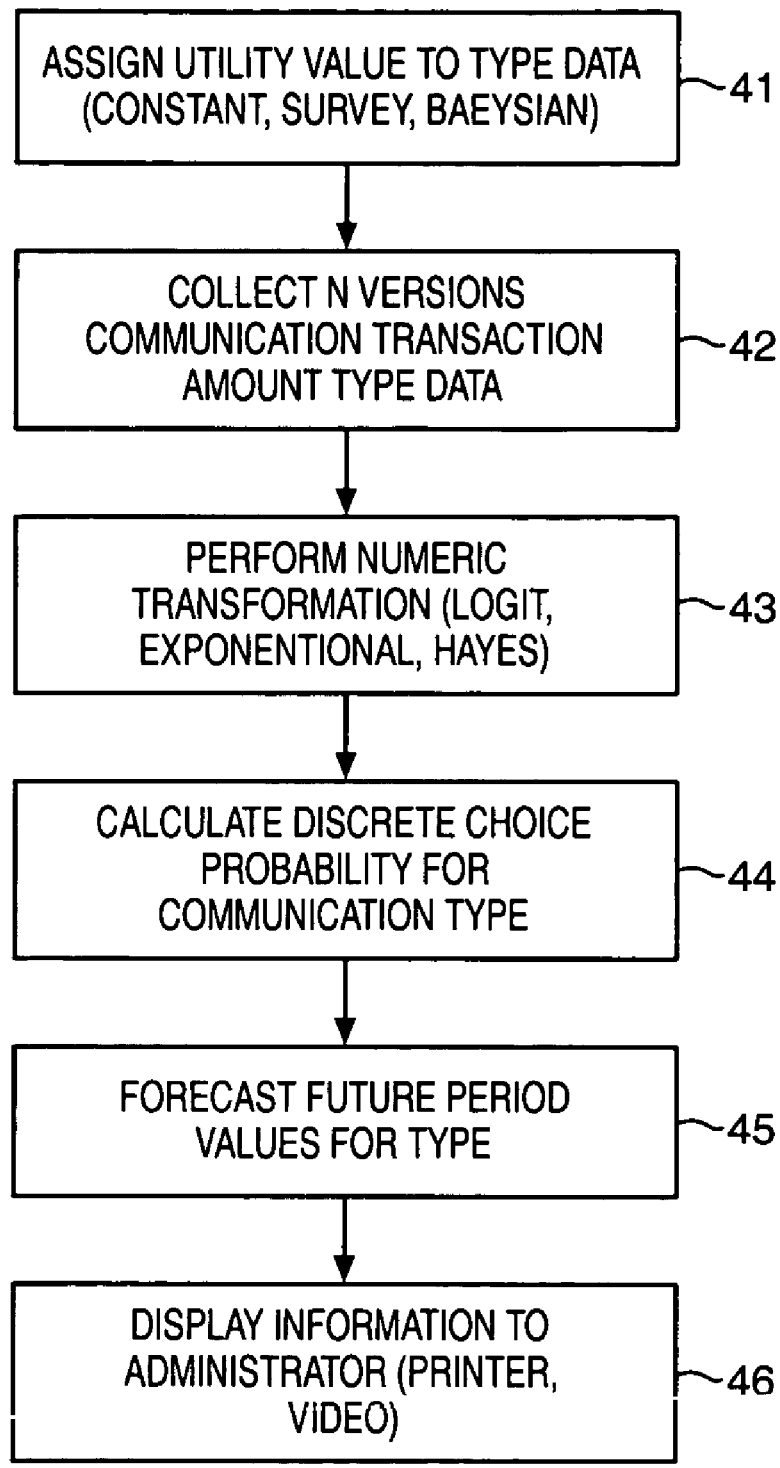
FIG. 12 is flow chart of the steps followed in performing a discrete choice modeling method for one possible embodiment of the invention.

The outline of the protocol or procedure for the software and method involved is shown in FIG. 12. The protocol is summarized below:

Step 1. Here, as shown in box 41, a utility value is assigned to the type of data.

Step 2. At this step, as shown in box 42, N versions of communication transaction type data are collected.

Step 3. Now the software performs a numeric transformation to the data (e.g. Logit, Exponential, Hayes, etc.) as shown in box 43.

Step 4. Next, the software calculates a discrete choice probability for the communication type, as shown in box 44.

Step 5. The software now forecasts future period values for the types of transactions being used, as shown in box 45.

Step 6. Then, as shown in box 46, the information is displayed to an administrator via a monitor or a printout.

At least one specific embodiment of a novel method for Discrete Choice Modeling has been described for exemplification of the one possible embodiment of the invention and is not intended to limit any possible embodiments of the invention to the specific embodiments illustrated. Numerous modifications and variations can be effectuated without deporting from the scope of the novel concepts of any possible embodiment of the invention. It is to be understood that no limitation with respect to the specific embodiment illustrated is intended or should be inferred. Accordingly, it is contemplated to cover by the applied claims any and all embodiments, modification, variations or equivalents that fall within the scope of the possible embodiments of the invention disclosed and claimed herein.

We claim:

1. A method performed by a processor for forecasting future communication transaction traffic from a customer comprising the steps of:
   a) collecting communication channel data of communication channel selections by the customer for at least first and second communication channels, each communication channel using a different communication method, and communication each communication channel available to be chosen by the customer for communications;
   b) performing a numeric transformation to the data;
   c) calculating a discrete choice probability of communication channel selection by the customer for each communication channel available to be chosen by the customer using discrete choice modeling; and
   d) forecasting future channel selection trends of communication channel selections to be made by the customer on at least one of the communication channels based on the discrete choice probabilities.

2. The method of claim 1 wherein the first communication channel is selected from one of a voice telephone number, a data telephone number, an email address, a sip address, an uniform resource locator (URL) address, an Uniform Resource Identifier (URI) address, an Internet Protocol (IP) address, an instant messaging identifier, and a cable box identifier.

3. The method of claim 1 wherein the second communication channel is selected from one of a voice telephone number, a data telephone number, an email address, a sip address, an uniform resource locator (URL) address, an Uniform Resource Identifier (URI) address, an Internet Protocol (IP) address, an instant messaging identifier, and a cable box identifier.

4. The method of claim 1 wherein the numeric transformation uses at least one of an exponential formula, a Hayes transformation, or a logit function.

5. The method of claim 1 wherein the calculation of a discrete choice probability results from an arithmetic operation of the numeric transforms.

6. The method of claim 1 wherein the calculation of a discrete choice probability is performed using multimedia logit estimation.

7. The method of claim 1 wherein the forecasting of future communication channel selection trends uses a least mean squares formula.

8. The method of claim 1 wherein the forecast is displayed on one of a printout from a printer or a visual display.

9. The method of claim 1, wherein the discrete choice probability of a communications channel is pA|[A,B], and $$pA|[A,B]=UA/(UA+UB)$$

where UA is an exponential transform value of a first communication channel value;
   where UB is an exponential transform value of a second communication channel value; and
   where (UA+UB) is a sum of the exponential transforms of multiple communication channels.

10. The method of claim 1, wherein the discrete choice probability of a communications channel equals 1, and $$pA+pB=1$$

wherein pA is the probability of use of a first communication channel value; and
   where pB is the probability of use of a second communication channel value.

11. A non-transitory computer-readable storage media embodying a program of instructions executable by a computer to perform the steps of:
   a) collecting communication channel selection data for a user on at least two communication channels;
   b) performing a numeric transformation to the data;
   c) calculating a discrete choice probability for the user of user communication channel selection of each communication channel using discrete choice modeling; and
   d) forecasting future communication channel selection trends for communication channel selections to be made by the user on the communication channels based upon the discrete choice probabilities.

12. The non-transitory computer-readable storage media of claim 11 wherein said media comprise at least one of a random access memory, a read only memory, a disk, an application specific integrated circuit, and a programmable read only memory.

13. The non-transitory computer-readable storage media tangibly embodying a program of instructions executable by a computer to perform the steps of:
   collecting communication channel user choice data on at least two communication channels available to be chosen by users for a communication;
   performing a numeric transformation to the data;
   calculating a discrete choice probability for user communication channel choices by the users for each communication channel using discrete choice modeling; and
   forecasting future period values for the communication channels based upon the discrete choice probabilities.

14. The non-transitory computer-readable storage media of claim 13 wherein said media comprise at least one of a random access memory, a read only memory, a disk, an application specific integrated circuit, and a programmable read only memory.

15. A processor for forecasting future communication transaction traffic from a customer comprising:
   means for collecting communication channel selection data of communication channel selections made by the customer on at least two communication channels;
   means for performing a numeric transformation to the data;
   means for calculating a discrete choice probability of communication channel selection by the customer for each communication channel using discrete choice modeling; and
   means for forecasting future communication channel selection values of communication channel selection made by the customer on at least one of the communication channels based on the discrete choice probabilities.

16. A processor for forecasting future communication transaction traffic from a customer comprising:
   means for collecting communication channel selection data of communication channel selections by the customer on at least two communication channels;
   means for performing a numeric transformation to the data;
   means for calculating a discrete choice probability of communication channel selections for each communication channel; and
   means for forecasting future period communication channel selection trends of the customer for the communication channels based on the discrete choice probabilities.

17. An apparatus programmed to forecast future communication transaction traffic comprising:
- a communications interface to a transaction processing system including at least one processor, wherein said communication interface provides communication channel traffic level information about a plurality of available communications channels, each of the plurality of communications channels using different communications method, to a computing system which determines discrete choice probabilities of communication channel selection by a customer for each channel based upon the traffic information; and
- a processing system, said processing system being disposed within the computing system for forecasting future trend values for channel selection by the customer based on the discrete choice probabilities for at least one of the plurality of communication channels.

18. An apparatus programmed to forecast future communication transaction traffic comprising:
- a communications interface to a transaction processing system including at least one processor, wherein said communication interface provides communication traffic level information about a user of a plurality of available communications channels, each of the plurality of communication channels using a different communications method, to a computing system; and
- a processing system, said processing system being disposed within the computing system for forecasting future trend values for communication channel selection by the user of at least one of the plurality of communication channels based upon discrete choice probabilities of communication channel selection by the user derived from the traffic level information.

19. A computer programmed to execute a process of forecasting communication transaction traffic, the process comprising:
- collecting communication channel selection data of channel selections by a customer on at least two communication channels;
- performing a numeric transformation to the data; and
- calculating a discrete choice probability of communication channel selection by the customer for user communication channel selection of each communication channel; and
- forecasting communication transaction traffic using the discrete choice probability of channel selection.

20. The computer of claim 19, wherein the process further comprises:
- forecasting future communication channel selection values for the customer selection of a communication channel.

21. The computer of claim 19, wherein the process further comprises:
- forecasting a probability of next communication channel selection by the customer of a communication channel based upon the discrete choice probabilities.

22. The computer to execute a process of forecasting communication transaction traffic of claim 19 wherein the collecting of communication channel data further comprises defining the communication channel as being a telephone number of an automatic contact distributor and the data as being call traffic level of the telephone number of the automatic contact distributor.

23. The computer of claim 19, wherein the discrete choice probability of a communications channel is pA|[A,B], and $$pA|[A,B]=UA/(UA+UB)$$

where UA is exponential transform value of a first communication channel value;
where UB is the exponential transform value of a second communication channel value; and
where (UA+UB) is sum of the numeric transforms of multiple communication channels.

24. The computer of claim 19, wherein the probability choosing communications channel equals 1, and $$pA+pB=1$$

wherein pA is the probability of use of a first communication channel value; and
where pB is the probability of use of a second communication channel value.

25. A method performed by a processor for forecasting future communication transaction traffic from a customer including the steps of:
- collecting over a selected time period N versions of communication transaction method selection data including at least two different communication transaction methods, the first method of communication transactions being identified as Type A mad the second method of communication transactions being identified as Type B;
- tabulating the data collected;
- performing a numeric transformation to the data;
- calculating a discrete choice probability of communications method selection by the customer for each communication method using discrete choice modeling;
- forecasting future trends of communication method selection made by the customer for each of the methods of communications transactions being used based on the discrete choice probabilities; and
- displaying the forecast.

26. The method of claim 25 wherein the Type A transaction uses one of a voice telephone number, a data telephone number, an email address, a sip address, an uniform resource locator (URL) address, an Uniform Resource Identifier (URL) address, an Internet Protocol (IP) address, an instant messaging identifier, or a cable box identifier.

27. The method of claim 25 wherein the Type B transaction uses one of a voice telephone number, a data telephone number, an email address, a sip address, an uniform resource locator (URL) address, an Uniform Recourse Identifier (URL) address, an Internet Protocol (IP) address, an instant messaging identifier, or a cable box identifier.

28. The method of claim 25 wherein the discrete choice modeling uses multimedia logit estimation.

29. The method of claim 25 wherein the numeric transformation uses an exponential formula.

30. The method of claim 25 wherein the numeric transformation uses Hayes modeling.

31. A system for forecasting future communication transaction traffic from a customer comprising:
- hardware and software for collecting over a selected time period N versions of communication transaction method selection data including at least two different communication transaction methods, the first method of communication transactions being identified as Type A and the second method of communication transactions being identified as Type B;
- hardware and software for tabulating the data collected;
- hardware and software for performing a numeric transformation to the data;
- hardware and software for calculating a discrete choice probability for communication method selection by the customer for each communication method using discrete choice modeling;

hardware and software for forecasting future probability values of selection by customer for each of the methods of communication transactions being used based upon the discrete choice probabilities; and display structure for displaying the forecast.

32. The system of claim 31 wherein the Type A transaction uses one of a voice telephone number, a data telephone number, an email address, a sip address, an uniform resource locator (URL) address, an Uniform Resource Identifier (URI) address, an Internet Protocol (IP) address, an instant messaging identifier, or a cable box identifier.

33. The system of claim 31 wherein the Type B transaction uses one of a voice telephone number, a data telephone number, an email address, a sip address, an uniform resource locator (URL) address, an Uniform Resource Identifier (URI) address, an Internet Protocol (IP) address, an instant messaging identifier, or a cable box identifier.

34. The system of claim 31 wherein the numeric transformation uses discrete choice modeling.

35. The system of claim 31 wherein the numeric transformation uses an exponential formula.

36. The system of claim 31 wherein the numeric transformation uses Hayes modeling.

* * * * *